(No Model.)

M. PERAGLIE & F. BARRO.
SOAP HOLDER.

No. 606,024.  Patented June 21, 1898.

WITNESSES

INVENTORS
Martino Peraglie,
Ferdinand Barro,
By John Wedderburn, Attorney

United States Patent Office.

MARTINO PERAGLIE AND FERDINAND BARRO, OF NEW YORK, N. Y.

SOAP-HOLDER.

SPECIFICATION forming part of Letters Patent No. 606,024, dated June 21, 1898.

Application filed April 3, 1897. Serial No. 630,539. (No model.)

*To all whom it may concern:*

Be it known that we, MARTINO PERAGLIE and FERDINAND BARRO, citizens of the United States, residing at New York, in the county of New York and State of New York, have invented certain new and useful Improvements in Soap-Holders; and we do hereby declare the following to be a full, clear, and exact description of the invention, such as will enable others skilled in the art to which it appertains to make and use the same.

This invention relates to soap-holders.

Our object is to provide a simple and cheap device adapted to secure a cake of soap in convenient position to the washstand-bowl or faucet where the soap is to be used which will permit the proper handling of the soap, but will be of such novel construction that the cake cannot be detached until practically consumed.

Having the foregoing objects in view, the invention consists of a soap-holder of novel construction, as will appear more fully hereinafter.

In the accompanying drawings, Figure 1 is a view showing the device in use. Fig. 2 is a detail section of the cake of soap and the locking device. Fig. 3 is a detail perspective view of the anchoring-lock; and Figs. 4 and 5, similar views, respectively, of the clamping-ring and the locking-catch.

The numeral 1 designates the anchoring-lock. This consists of a band 2, having openings 3 therein and formed into the shape of a loop, and a socket 4, which is flattened and elongated and provided with oppositely-disposed openings 5 and 6.

The numeral 7 designates the locking-catch, the same being formed of a single piece of spring metal bent into an eye 8, and diverging legs 9 and 10, which terminate in oppositely-extending feet 11 and 12, which are separated a greater distance than the width of the sockets, so that they will have to be compressed in order to be inserted into the latter.

The numeral 13 designates the clamping-ring, which is made from a single piece of material and has its ends formed into ears that lie against each other. There is a headed bolt 14, which passes through the ears, and 15 designates a nut, which screws on the end of the bolt. It will be observed that both the head of the bolt and the nut are rounded, so that after being screwed up it will be necessary to employ a suitable implement in order to unfasten the same. Provision is thus made to prevent detachment of the clamp by unauthorized persons. This clamp encircles the faucet 16.

The numeral 17 designates a chain which connects the locking-catch and the clamp.

The cake of soap is shown at 18. The anchoring-lock is embedded in the cake of soap when the latter is made, and is so placed in relation thereto that the mouth of the socket will lie flush with the surface of the cake.

When it is desirable to attach a cake of soap, the legs of the locking-catch are compressed and inserted in the socket. When said catch has been pushed far enough in the socket, the feet will spring outwardly and be received in the openings. The cake is then securely connected to the chain, and the parts cannot be detached until the cake has been worn down through usage so as to expose the ends of the feet, it being noted that the lengths of the feet 11 and 12 are greater than the distance between that portion of the legs lying outside the tubular extension, so that the compression of the legs outside the said extension could not withdraw the feet from the openings 5 and 6. The said feet can then be pressed inwardly and the locking-catch withdrawn from the socket. Another cake of soap can then be attached. It will thus be seen that owing to the formation of the clamping-ring and the position of the locking-catch and socket when the same are connected detachment of the parts is not possible unless the same be broken.

The employment of the loop and the anchoring-lock is of great advantage, for it will be observed that owing to the formation of said loop the lock cannot be pulled out of the cake, and by the employment of the openings in said loop when the cake is being formed portions of the cake pass through the openings and more readily lock the loop in position.

Slight and immaterial changes in construction might be resorted to in carrying out the present invention without detracting from any of the advantages thereof, and hence it is to be understood that we reserve unto ourselves the right to make all such changes as properly come within the spirit and scope of the invention.

Having thus described our invention, what we claim as new, and desire to secure by Letters Patent, is—

1. The combination with a cake of soap, of a looped band embedded therein, the material of the soap lying partially within the band to firmly anchor the latter a tubular socket secured to the loop and having its outer end flush with the surface of the soap, whereby access to said socket may be had, lateral openings at the inner end of the socket, a spring-catch adapted to enter the socket, consisting of a strip of metal bent upon itself to form an eye, and a flexible connection in said eye, the ends of the strip being bent outwardly to engage the openings in the socket when passed into the latter.

2. The combination with a cake of soap of a looped band having transverse openings and embedded in the cake, the material of the soap entering the openings in the band and lying partially within the loop, a tubular socket lying in the plane of the loop secured to the loop and having its outer end flush with the surface of the soap, whereby access to said socket may be had, lateral openings at the inner end of the socket, a spring-catch entering the socket, consisting of a strip of metal bent upon itself to form an eye, and a permanent flexible connection in said eye, the ends of the strip being bent outwardly and engaging the openings in the socket.

In testimony whereof we have signed this specification in the presence of two subscribing witnesses.

MARTINO PERAGLIE.
FERDINAND BARRO.

Witnesses:
HUGO STAEHELRADT,
CHARLES FISCHILL.